United States Patent
Hwang et al.

(10) Patent No.: US 8,031,966 B2
(45) Date of Patent: Oct. 4, 2011

(54) METHOD AND APPARATUS FOR DETERMINING WHETHER BACKLIGHT EXISTS

(75) Inventors: Young-kyoo Hwang, Seoul (KR);
Jung-bae Kim, Hwaseong-si (KR);
Jong-ha Lee, Hwaseong-si (KR);
Seong-deok Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 781 days.

(21) Appl. No.: 12/081,416

(22) Filed: Apr. 15, 2008

(65) Prior Publication Data
US 2009/0129626 A1    May 21, 2009

(30) Foreign Application Priority Data
Nov. 15, 2007   (KR) .................. 10-2007-0116764

(51) Int. Cl.
*G06T 5/50* (2006.01)

(52) U.S. Cl. ...................................................... 382/274
(58) Field of Classification Search ................ None
See application file for complete search history.

(56) References Cited

U.S. PATENT DOCUMENTS
7,010,160 B1 * 3/2006 Yoshida ..................... 382/162
2008/0012956 A1 * 1/2008 Nihei et al. ................ 348/222.1

OTHER PUBLICATIONS

TechDictionary.com (2011), http://www.techdictionary.com/search_action.lasso (last visited Apr. 13, 2011).

* cited by examiner

*Primary Examiner* — Brian Werner
(74) *Attorney, Agent, or Firm* — Staas & Halsey LLP

(57) ABSTRACT

Provided are a method and apparatus for determining whether backlight exists. The method according to an embodiment of the present invention includes calculating scattering degrees of luminance values of pixels included in each of images which represent the same photographic subject and have different brightness levels from each other; and determining whether backlight exists on the photographic subject in consideration of the calculated scattering degrees.

11 Claims, 4 Drawing Sheets

METHOD AND APPARATUS FOR DETERMINING WHETHER BACKLIGHT EXISTS

CROSS-REFERENCE TO RELATED PATENT APPLICATION

This application claims the benefit of Korean Patent Application No. 10-2007-0116764, filed on Nov. 15, 2007, in the Korean Intellectual Property Office, the disclosure of which is incorporated herein in its entirety by reference.

BACKGROUND OF THE INVENTION

1. Field of the Invention

The present invention relates to a photographing device such as a digital camera, and more particularly, to a method and apparatus for determining whether backlight exists on a photographic subject.

2. Description of the Related Art

When backlight exists on a photographic subject, if the backlight is not considered, the photographic subject is photographed so as to be excessively dark. Thus, when backlight exists on a photographic subject, a photographing device such as a digital camera recognizes the backlight and performs a series of processes before the photographic subject is photographed in order to obtain a clear image of the photographic subject even when the backlight exists. Turning flash on and increasing an exposure value (EV) of the photographing device are examples of the processes.

However, a conventional photographing device may wrongly determine that backlight exists on a photographic subject, for example, when the photographic subject is originally very dark or when the photographic subject is disposed in very bright surroundings. Thus, the conventional photographing device may not clearly photograph the photographic subject on which backlight does not actually exist, by performing the above processes before the photographic subject is photographed.

SUMMARY OF THE INVENTION

The present invention provides an apparatus for determining whether backlight exists by which a photographic subject on which backlight does not exist may be prevented from being wrongly determined as a photographic subject on which backlight exists.

The present invention also provides a method of determining whether backlight exists by which a photographic subject on which backlight does not exist may be prevented from being wrongly determined as a photographic subject on which backlight exists.

The present invention also provides a computer readable recording medium having recorded thereon a computer program for executing a method of determining whether backlight exists by which a photographic subject on which backlight does not exist may be prevented from being wrongly determined as a photographic subject on which backlight exists.

According to an aspect of the present invention, there is provided an apparatus for determining whether backlight exists, the apparatus including a calculation unit for calculating scattering degrees of luminance values of pixels included in each of images which represent the same photographic subject and have different brightness levels from each other; and a determination unit for determining whether backlight exists on the photographic subject in consideration of the calculated scattering degrees.

According to another aspect of the present invention, there is provided a method of determining whether backlight exists, the method including calculating scattering degrees of luminance values of pixels included in each of images which represent the same photographic subject and have different brightness levels from each other; and determining whether backlight exists on the photographic subject in consideration of the calculated scattering degrees.

According to another aspect of the present invention, there is provided a computer readable recording medium having recorded thereon a computer program for executing a method of determining whether backlight exists, the method including calculating scattering degrees of luminance values of pixels included in each of images which represent the same photographic subject and have different brightness levels from each other; and determining whether backlight exists on the photographic subject in consideration of the calculated scattering degrees.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The attached drawings for illustrating exemplary embodiments of the present invention are referred to in order to gain a sufficient understanding of the present invention, the merits thereof, and the objectives accomplished by the implementation of the present invention.

Hereinafter, the present invention will be described in detail by explaining embodiments of the invention with reference to the attached drawings.

Figure 1:
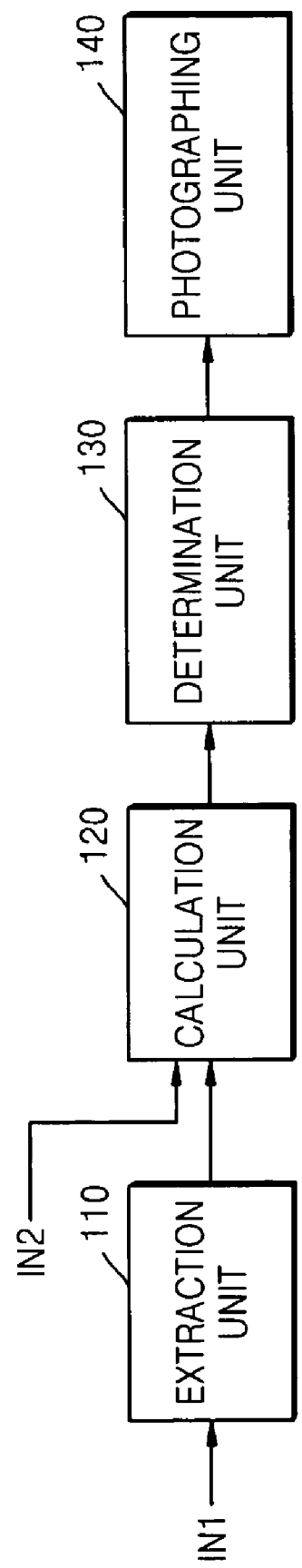
FIG. 1 is a block diagram of an apparatus for determining whether backlight exists, according to an embodiment of the present invention.

FIG. 1 is a block diagram of an apparatus for determining whether backlight exists, according to an embodiment of the present invention.

The apparatus according to the current embodiment of the present invention may be implemented in a photographing device such as a digital camera. Here, the photographing device may obtain an image representing a scene shown through a lens included in the photographing device. In this case, the scene is composed of at least one of a photographic subject and a background. In more detail, if a shutter button (not shown) included in the photographing device is half-pressed, the photographing device generates and obtains a preview image that represents a scene shown through the lens at the time when the shutter button is half-pressed. Also, if the shutter button is fully pressed, the photographing device generates and obtains a photographic image that represents a scene shown through the lens at the time when the shutter button is fully pressed. Meanwhile, the photographing device may obtain a black-and-white image or a color image.

The apparatus calculates scattering degrees of luminance values of pixels included in preview images which represent the same photographic subject and have different brightness levels from each other, and determines whether backlight exists on the photographic subject in consideration of the calculated scattering degrees. In this case, the number of the preview images is not restrictive. However, for convenience of explanation, it is assumed that the preview images are first and second preview images hereinafter.

Operations of the apparatus will now be described in detail with reference to FIG. 1. Referring to FIG. 1, the apparatus includes an extraction unit 110, a calculation unit 120, a determination unit 130, and a photographing unit 140, which operate as described below.

In consideration of luminance values of a first preview image that is input through an input terminal IN 1, the extraction unit 110 extracts pixels 'having luminance values equal to or less than a preset reference luminance value' from the first preview image, as a first target image. In the present invention, the first preview image is an arbitrary preview image.

The calculation unit 120 determines pixels which 'match to the first target image and are included in a second preview image that is input through an input terminal IN2', as a second target image.

In the present invention, the second preview image is an arbitrary preview image which (i) represents a scene the same as the scene represented by the first preview image and (ii) has a brightness level different from the brightness level of the first preview image. In more detail, an EV of the photographing device in a case when the photographing device generates the first preview image is different from that in a case when the photographing device generates the second preview image. Hereinafter, for convenience of explanation, it is assumed that the photographing device obtains the first preview image by generating a preview image representing a certain scene, in accordance with an EV having a default value, increases the EV, and then obtains the second preview image by generating a preview image representing the same scene, in accordance with the EV having an increased value.

Meanwhile, the second target image of the second preview image is an image corresponding to 'positions of the first target image of the first preview image'. A scene represented by the first preview image is the same as the scene represented by the second preview image and thus a scene represented by the first target image is the same as the scene represented by the second target image.

The calculation unit 120 calculates a scattering degree of luminance values of the pixels included in the first target image, as a first scattering degree. Here, the scattering degree of the luminance values is a degree of scattering of the luminance values based on a representative value of the luminance values. A variance is an example of the scattering degree. That is, the calculation unit 120 may calculate the variance of the luminance values of the pixels included in the first target image, as a first variance.

The calculation unit 120 calculates a scattering degree of luminance values of the pixels included in the second target image that is determined by the calculation unit 120, as a second scattering degree. For example, the calculation unit 120 may calculate a variance of the luminance values of the pixels included in the second target image, as a second variance.

The calculation unit 120 calculates a ratio between the calculated first and second scattering degrees. For example, the calculation unit 120 calculates 'the second variance/the first variance'.

In consideration of the first and second scattering degrees, the determination unit 130 determines whether backlight exists on a photographic subject represented on the first preview image (or the second preview image). In more detail, the determination unit 130 determines whether backlight exists on the photographic subject represented on the first preview image (or the second preview image) by comparing the first and second scattering degrees calculated by the calculation unit 120 to each other. For example, the determination unit 130 determines whether 'the second variance/the first variance' calculated by the second calculation unit 120 is equal to or less than a 'preset threshold value'. If 'the second variance/the first variance' is determined to be equal to or less than the 'preset threshold value', the determination unit 130 recognizes that backlight does not exist on the photographic subject. If 'the second variance/the first variance' is determined to be greater than the 'preset threshold value', the determination unit 130 recognizes that backlight exists on the photographic subject.

In response to a determination result of the determination unit 130, the photographing unit 140 sets at least one of 'on/off of flash' and the 'EV' before the photographic subject is photographed. In more detail, if the determination unit 130 determines that 'backlight does not exist on the photographic subject', the photographing unit 140 photographs the photographic subject by not turning the flash on in accordance with the EV having a default value so as to generate and obtain a photographic image. On the other hand, if the determination unit 130 determines that 'backlight exists on the photographic subject', the photographing unit 140 photographs the photographic subject by turning the flash on, by increasing the EV from the default value, or by turning the flash on and increasing the EV from the default value, so as to generate and obtain the photographic image.

Figure 2A:
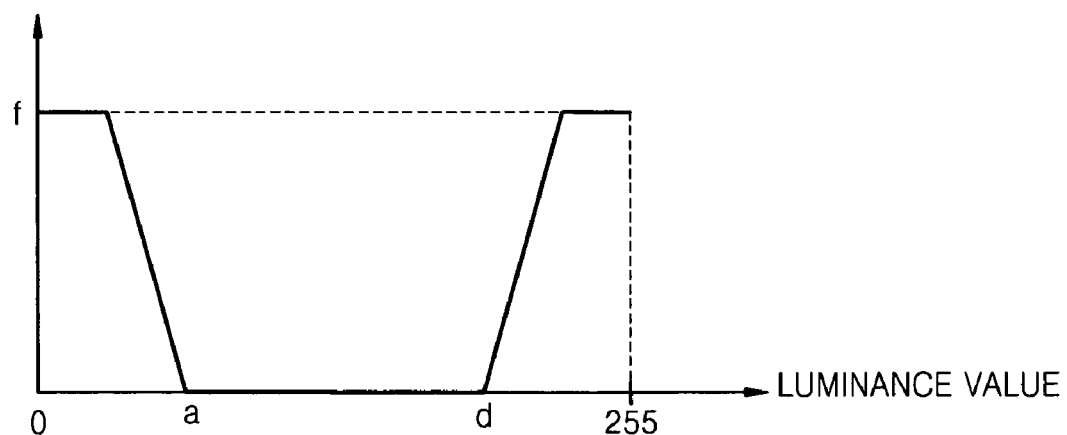
FIGS. 2A and 2B are graphs respectively illustrating characteristics of first and second preview images of a photographic subject on which backlight exists, according to embodiments of the present invention.
Figure 2B:
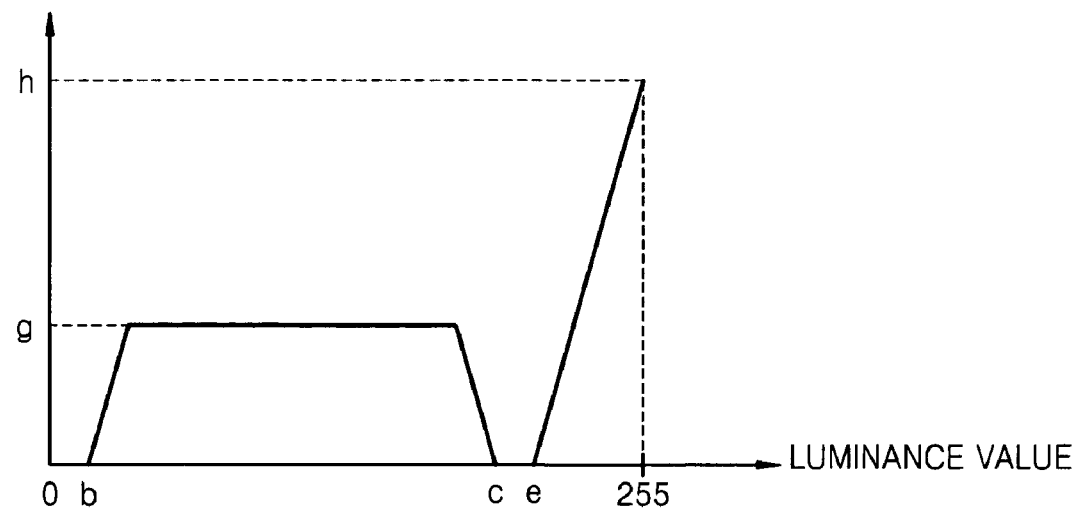

FIGS. 2A and 2B are graphs respectively illustrating characteristics of first and second preview images of a photographic subject on which backlight exists, according to an embodiment of the present invention.

Referring to FIGS. 2A and 2B, a luminance value of each pixel included in a first preview image or a second preview image is one of values 0 through 255, each of a, b, c, d, and e is an integer ($0<b<a<d<c<e<255$), and each of f, g, and h is a natural number ($g<f<h$).

Pixels included in the first preview image are divided into 'pixels having luminance values equal to or greater than 0, and equal to or less than a' and 'pixels having luminance values equal to or greater than d, and equal to or less than 255'. Here, the 'pixels having luminance values equal to or greater than 0, and equal to or less than a' are included in the photographic subject and the pixels included in the photographic subject are dark because backlight exists on the photographic subject. Also, the 'pixels having luminance values equal to or greater than d, and equal to or less than 255' are included in a background and the pixels included in the background are bright because backlight exists on the photographic subject.

Meanwhile, pixels included in the second preview image are divided into 'pixels having luminance values equal to or greater than b, and equal to or less than c' and 'pixels having luminance values equal to or greater than e, and equal to or less than 255'.

Here, a relationship between the 'pixels having luminance values equal to or greater than 0, and equal to or less than a' which are included in the first preview image and the 'pixels having luminance values equal to or greater than b, and equal to or less than c' which are included in the second preview image is the same as the relationship between the first and second preview images. That is, a scene represented by the 'pixels having luminance values equal to or greater than 0, and equal to or less than a' which are included in the first preview image is the same as the scene represented by the 'pixels having luminance values equal to or greater than b, and equal to or less than c' which are included in the second preview image.

Likewise, a relationship between the 'pixels having luminance values equal to or greater than d, and equal to or less than 255' which are included in the first preview image and the 'pixels having luminance values equal to or greater than e, and equal to or less than 255' which are included in the second preview image is also the same as the relationship between the first and second preview images. That is, a scene represented by the 'pixels having luminance values equal to or greater than d, and equal to or less than 255' which are included in the first preview image is the same as the scene represented by the 'pixels having luminance values equal to or greater than e, and equal to or less than 255' which are included in the second preview image.

Figure 3A:
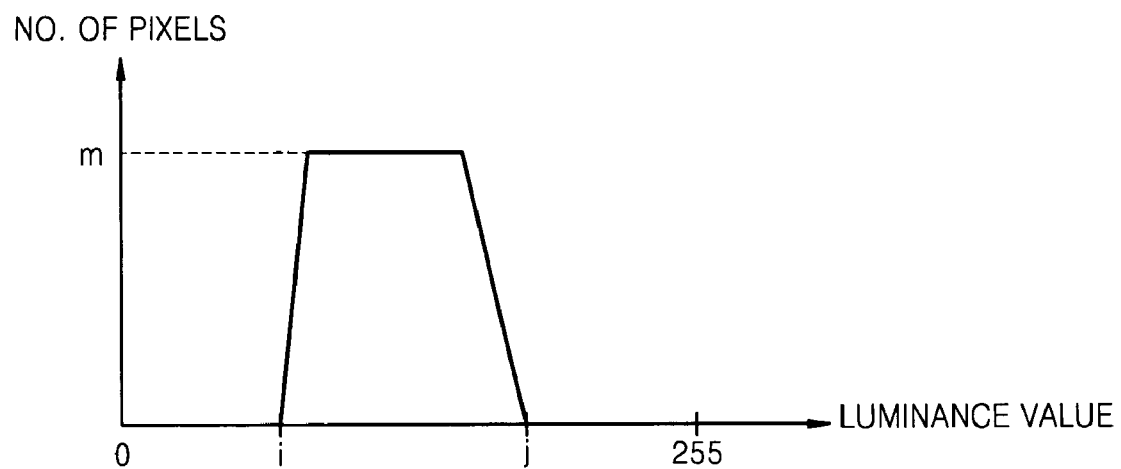
FIGS. 3A and 3B are graphs respectively illustrating characteristics of first and second preview images of a photographic subject on which backlight does not exist, according to embodiments of the present invention.
Figure 3B:

FIGS. 3A and 3B are graphs respectively illustrating characteristics of first and second preview images of a photographic subject on which backlight does not exist, according to an embodiment of the present invention.

Referring to FIGS. 3A and 3B, a luminance value of each pixel included in a first preview image or a second preview image is one of values 0 through 255, each of i, j, k, and l is an integer (0<k<i<j<l<255), and each of m and n is a natural number (m>n).

A relationship between 'pixels having luminance values equal to or greater than i, and equal to or less than j' which are included in the first preview image and 'pixels having luminance values equal to or greater than k, and equal to or less than l' which are included in the second preview image is the same as the relationship between the first and second preview images. That is, a scene represented by the 'pixels having luminance values equal to or greater than i, and equal to or less than j' which are included in the first preview image is the same as the scene represented by the 'pixels having luminance values equal to or greater than k, and equal to or less than l' which are included in the second preview image.

In FIGS. 2A and 2B, a distance 'c-b' is greatly increased from a distance 'a-0'. However, in FIGS. 3A and 3B, a distance 'l-k' is increased a little from a distance 'j-i'. In other words, as illustrated in FIGS. 2A and 2B, if backlight exists on the first and second preview images, a range of luminance values of a second target image is greatly larger than the range of luminance values of a first target image. On the other hand, as illustrated in FIGS. 3A and 3B, if backlight does not exist on the first and second preview images, the range of luminance values of the second target image is just a little larger than the range of luminance values of the first target image.

As described above, how different a scattering decree of luminance values of 'a partial image (i.e., a second target image)' included in a second preview image is from the scattering decree of luminance values of 'a partial image (i.e., a first target image)' included in a first preview image, is determined by a fact whether backlight exists on a photographic subject represented on the first preview image (or the second preview image).

By using the above principle, the apparatus according to the current embodiment of the present invention (i) determines whether backlight exists on a photographic subject in consideration of scattering degrees of luminance values of pixels included in first and second target images instead of the scattering degrees of luminance values of pixels included in first and second preview images, and (ii) recognizes that backlight does not exist on the photographic subject if 'a second variance/a first variance' is equal to or less than a preset threshold value and recognizes that backlight exists on the photographic subject if 'the second variance/the first variance' is greater than the preset threshold value.

As such, according to an embodiment of the present invention, it may be correctly determined whether backlight exists on a photographic subject. Accordingly, a photographic subject on which backlight does not exist may not be wrongly determined as a photographic subject on which backlight exists.

Figure 4:
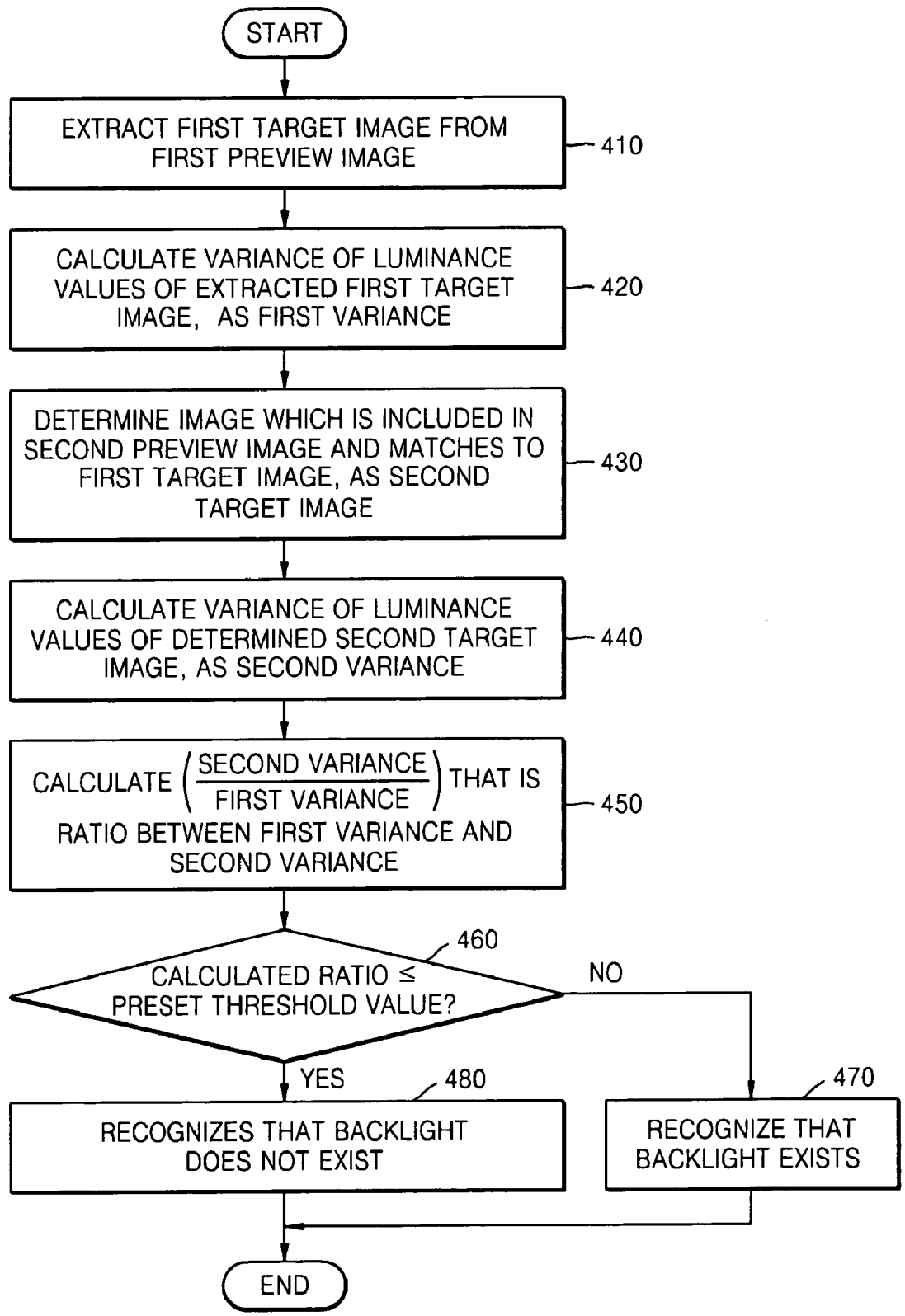
FIG. 4 is a block diagram of a method of determining whether backlight exists, according to an embodiment of the present invention.

FIG. 4 is a block diagram of a method of determining whether backlight exists, according to an embodiment of the present invention. FIG. 4 will be described in conjunction with FIG. 1.

The method according to the current embodiment of the present invention includes calculating scattering degrees of luminance values of pixels included in images which represent the same photographic subject and have different brightness levels from each other (operations 410, 420, 430, 440, and 450); and determining whether backlight exists on the photographic subject in consideration of the calculated scattering degrees (operations 460, 470, and 480).

In more detail, the extraction unit 110 extracts a first target image from a first preview image in operation 410, and the calculation unit 120 calculates a variance of luminance values of pixels included in the first target image extracted in operation 410, as a first variance in operation 420.

The calculation unit 120 determines an image which '(i) is included in a second preview image and (ii) matches to the first target image extracted in operation 410', as a second target image in operation 430, and calculates a variance of luminance values of pixels included in the determined second target image, as a second variance in operation 440.

Operations 430 and 440 may be performed after operation 420 is performed, as illustrated. However, operations 430 and 440 may also be performed before operation 420 is performed or be performed while operation 420 is being performed.

After operations 420 and 440 are performed, the calculation unit 120 calculates 'the second variance in operation 440/the first variance in operation 420' that is a ratio between the first variance in operation 420 and the second variance in operation 440, in operation 450.

After operation 450 is performed, the determination unit 130 determines whether the ratio calculated in operation 450 is equal to or less than a preset threshold value in operation 460.

If it is determined that 'the ratio calculated in operation 450 is equal to or less than the preset threshold value' in operation 460, the determination unit 130 recognizes that backlight does not exist on the photographic subject represented on the first preview image (or the second preview image) in operation 470.

If it is determined that 'the ratio calculated in operation 450 is greater than the preset threshold value' in operation 460, the determination unit 130 recognizes that backlight exists on the photographic subject represented on the first preview image (or the second preview image) in operation 480.

The method according to the current embodiment of the present invention can be written as a computer program using a computer readable recording medium. Examples of the computer readable recording medium include magnetic storage media (e.g., ROM, floppy disks, hard disks, etc.) and optical recording media (e.g., CD-ROMs, or DVDs).

As described above, according to the above embodiments of the present invention, a photographic subject on which backlight does not exist may be prevented from being wrongly determined as a photographic subject on which backlight exists.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for determining whether backlight exists, the apparatus comprising:
   a calculation unit to calculate, using a computer, scattering degrees of luminance values of pixels included in each of images which represent the same photographic subject and have different brightness levels from each other; and
   a determination unit to compare the calculated scattering degrees and to determine whether backlight exists on the photographic subject using the result of the comparison,
   wherein the scattering degrees are variances.

2. The apparatus of claim 1, wherein the calculation unit calculates a scattering degree of luminance values of pixels included in a first image having luminance values equal to or less than a preset reference luminance value and a scattering degree of luminance values of pixels included in at least one of the images matching to the pixels.

3. The apparatus of claim 1, wherein the determination unit determines whether backlight exists by comparing the calculated scattering degrees to each other in reference to a preset threshold value.

4. The apparatus of claim 1, wherein the calculation unit calculates a ratio between the scattering degrees, and
   the determination unit compares the calculated ratio to a preset threshold value using the result of the comparison.

5. The apparatus of claim 1, further comprising a photographing unit to set at least one of on/off of flash and an exposure value (EV) when it is determined whether backlight exists on the photographic subject, before the photographic subject is photographed.

6. A method of determining whether backlight exists, the method comprising:
   calculating, using a computer, scattering degrees of luminance values of pixels included in each of images which represent the same photographic subject and have different brightness levels from each other; and
   determining whether backlight exists on the photographic subject by comparing the calculated scattering degrees,
   wherein the scattering degrees are variances.

7. The method of claim 6, wherein the calculating comprises calculating a scattering degree of luminance values of pixels included in a first image having luminance values equal to or less than a preset reference luminance value and calculating a scattering degree of luminance values of pixels included in at least one of the images matching to the pixels.

8. The method of claim 6, wherein the determining whether backlight exists comprises comparing the calculated scattering degrees to each other in reference to a preset threshold value.

9. The method of claim 6, wherein the calculating further comprises calculating a ratio between the scattering degrees, and
   the determining comprises comparing the calculated ratio to a preset threshold value and determining whether backlight exists on the photographic subject using the result of the comparison.

10. The method of claim 6, further comprising setting at least one of on/off of flash and an exposure value (EV) using the determining result, before the photographic subject is photographed.

11. A non-transitory computer readable recording medium having recorded thereon a computer program for executing the method of any one of claims 6 through 10.

* * * * *